United States Patent [19]
Kohno

[11] Patent Number: 5,512,101
[45] Date of Patent: Apr. 30, 1996

[54] SEED SUPPLYING AND COATING APPARATUS

[75] Inventor: Yasushi Kohno, Susono, Japan

[73] Assignee: Yazaki Corporation, Tokyo, Japan

[21] Appl. No.: 408,308

[22] Filed: Mar. 22, 1995

[30] Foreign Application Priority Data

Mar. 24, 1994 [JP] Japan ................... 6-053595

[51] Int. Cl.⁶ .................................................. B05C 5/00
[52] U.S. Cl. ............................ 118/668; 118/712; 118/23; 118/29; 118/303; 118/423
[58] Field of Search ..................... 118/668, 712, 118/303, 423, 23, 29; 427/4, 8, 212, 213.35; 47/57.6; 118/23, 29

[56] References Cited

U.S. PATENT DOCUMENTS 4,806,357  2/1989  Garrett et al. ................. 118/712
5,080,925  1/1992  Kouno ................................ 427/4
5,254,358  10/1993  Kouno et al. .................... 427/4

FOREIGN PATENT DOCUMENTS 57016  2/1993  Japan.
57015  2/1993  Japan.

Primary Examiner—Laura Collins
Attorney, Agent, or Firm—Nikaido, Marmelstein, Murray & Oram

[57] ABSTRACT

In the bottom of a seed vessel containing seeds is provided a throughhole through which a seed supply rod is longitudinally movably passed. The supply rod is connected to an actuator to be movably driven. When the supply rod is moved upwardly, it carries a small number of seeds on the top surface thereof to bring the seeds close to a suction tip so that the suction tip sucks one seed therefrom. Since the suction tip sucks one seed from the limited number of seeds on top of the supply rod, it becomes unlikely that a plurality of seeds sucked into the suction tip interfere with each other to cause the suction tip to make errors in sucking seeds.

5 Claims, 5 Drawing Sheets

SEED SUPPLYING AND COATING APPARATUS

BACKGROUND OF THE INVENTION

1. Field of the Invention

This invention relates to a seed supplying mechanism for seed coating apparatus that coat seeds with a gel containing nutrients, sterilizers or the like and having elastic properties.

2. Description of the Prior Art

It is conventionally general that seeds are sowed without coating. However, in order to protect seeds from being eaten by animals or to subject seeds to preliminary processing for improvement in sterilization and germination, coating has been employed.

A seed is conventionally coated with clay, fine sand or a mixture of clay or fine sand with sugar adhered to the periphery of the seed by means of a binder such as CMC (carboxymethyl cellulose) sprayed. A sterilizing or oxygen-generating agent may be included in the coating material.

The coating obtained in these examples is relatively of a hard nature, but a seed may be covered with a gel or gelatin-like material that swells on containing water to provide soft coating.

In the conventional coating technique, however, there are found no examples in which seeds are coated with an aqueous gel that cures only a surface of the coating layer.

To realize the above, there has been developed a seed coating apparatus and is disclosed, e.g. in Japanese UM application Laid-Open Specifications Nos. Hei 5-7015 and Hei 5-7016, in which a seed is dropped and supplied to a layer of gel and enclosed therein when the gel is sphericalizod.

The seed coating apparatus includes a gel discharging mechanism and a seed supplying mechanism, and when a gelatinizing agent is discharged from a nozzle in the gel discharging mechanism and forms a layer below the nozzle which gradually droops by its own weight, the seed supplying mechanism drops a seed to the layer from above so that it is held in the drooping layer.

On subsequent supply of the gelatinizing agent from the nozzle, a gel layer is formed in which the seed and air are sealed. The gel layer gravitationally drops when it no longer can sustain its own weight and is supplied to a curing liquid in a curing vessel while sphericalizod during its falling.

An outline of the gel discharging mechanism will be given below. The gel discharging mechanism B, as shown in FIG. 6, includes a valve main body 1 rectangular in cross-section in which is formed an open portion 2 in communication with a gel pressurizing plunger (not shown). A pipeway 42 (FIG. 1) extends from an opening 3 at the lower end of the valve main body 1 to a coating material storing tank 41 between the opening 3 and the open portion 2 is arranged a check valve-constituting steel ball 4 to open and close the opening 3; and a valve casing 5 is mounted at the left side of the valve main body 1.

The valve casing 5 has a plunger insertion hole 6 vertically extending therethrough, at the lower end of which is formed a valve seat 6a. A bush 7 is fitted inside the plunger insertion hole 6 and in the the bush 7 is vertically movably inserted a hollow nozzle plunger 8. The nozzle plunger 8 has at the lower half thereof an outer periphery reduced in diameter to provide a pressure receiving surface 8a.

A gel flow channel 9 is provided to communicate the plunger insertion hole 6 and the open portion 2, so that the gel fed from the coating material storing tank to the open portion 2 via the opening 3 and the check valve 4 fills the gel flow channel 9 and the plunger insertion hole 6.

At its upper end the valve casing 5 is provided with a cylindrical portion 10 with a hollow interior in alignment with the plunger insertion hole 6. The cylindrical portion 10 is at its outer periphery formed with a male screw 10a, so that a spring adjuster 11 with a corresponding female screw 11a formed on its inner periphery is threaded over the male screw 10a. A spring receiver 12 is mounted on the nozzle plunger 8, and a spring 13 is interposed between the spring receiver 12 and the spring adjuster 11 to urge the nozzle plunger 8 downwardly.

The lower end of the nozzle plunger 8 is thus normally seated on a valve seat 6a to close the valve. As the gel pressurizing plunger is moved so as to pressurize the gel inside the gel flow channel 9, the gel presses the pressure receiving surface 8a to move the nozzle plunger 8 upwardly and open the valve, thereby causing the gel to be discharged from below the nozzle plunger 8.

As the gel pressurizing plunger is moved back and the pressure on the gel in the gel flow channel 9 is reduced, the nozzle plunger 8 is urged downwardly by the spring 13 to close the valve, while causing the gel to be supplied from the check valve.

As the nozzle plunger 8 is lowered to close the valve, the discharge of the gel is stopped, while at the same time the gel that remains at the underside of the valve seat forms a gel layer below the plunger insertion hole 6, which gradually droops by its own weight.

Concurrently, a seed is dropped from an above-located seed supply apparatus onto the gel layer so that the seed is enclosed together with a bubble in the drooping gel layer. The gel supplied on subsequent opening of the valve covers top of the drooping gel layer. As a result, the gel layer that can no longer sustain its own weight drops gravitationally to a curing vessel (not shown) while sphericalized due to the surface tension during falling.

Conventional seed supply apparatuses include an apparatus of the type in which an aperture is perforated through a hollow rotary drum to vacuum-attract a seed when the pressure inside the rotary drum is made negative, and an apparatus of the type in which a suction tip is employed to vacuum-attract a seed from a seed-containing vessel.

In the conventional seed supply apparatus of the suction tip type, at an end of a rotary arm rotatably driven by a rotary actuator is provided a hollow suction tip having a tapered end, with the tapered end directed downwardly. When rotation of the rotary arm is stopped, a seed vessel containing a large number of seeds is moved upwardly towards the suction tip to allow the same to vacuum-attract a seed therefrom. When a seed is confirmed attracted, the seed vessel is lowered and the rotary arm is rotated to position the suction tip just above the gel discharging mechanism, followed by supplying an air pressure to the suction tip and causing the suction tip to drop the seed through the nozzle plunger in the gel discharging mechanism to the gel layer.

The seed coating apparatus of the suction tip type has the following drawbacks:

1) There is a limitation to the size of the seed vessel that carries seeds and moves upwardly and downwardly. As the number of seeds in the seed vessel is gradually reduced, it becomes more likely that the suction tip makes errors in sucking seeds, making it necessary that the suction tip retries attracting each time. Consequently, the capability of the seed coating apparatus is lowered.

Likewise, when seeds are added in the seed vessel in large numbers, it is likely that a plurality of seeds sucked to the suction tip interfere with each other to cause an error in vacuum-attracting.

2) To solve the above drawback, it is necessary to provide a device that automatically supplies seeds and prevent a reduction in the number of seeds contained in the seed vessel. This solution, however, has the following drawbacks:
  i) Seeds are different in volume and mass depending on the kind of seeds, and thus each time the seeds to be coated are changed, the automatic seed supplying device must be largely adjusted accordingly.
  ii) It is difficult to automatically supply seeds to the seed vessel repeatedly moved upwardly and downwardly.
  iii) The automatic seed supplying device has a complicated structure and leads to a high production cost.

SUMMARY OF THE INVENTION

This invention has been accomplished to overcome the above drawbacks and an object of this invention is to provide a seed supplying apparatus for seed coating apparatus which is enhanced in seed-sucking performance and which requires no automatic seed supplying device.

In order to attain the object described above, according to this invention, there is provided a seed supplying mechanism for seed coating apparatus, which comprises: a mounting table; a rotary drive having a rotary shaft, fixedly mounted on an upper surface of the mounting table; a rotary arm fixed at a center thereof to the rotary shaft of the rotary drive; suction tips provided at opposite ends of the rotary arm for sucking and dropping seeds, the suction tips each connected to a pipeway in communication by way of an electromagnetic valve to a positive pressure source and a negative pressure source; a seed vessel provided at one side of the mounting table for containing seeds therein, the seed vessel being opened at an upper portion thereof and having a throughhole in a bottom portion thereof; a supply rod with a seed carrying surface, passed through the throughhole in the bottom portion of the seed vessel and connected at a lower end thereof with an actuator for driving the supply rod upwardly to bring the seed carrying surface close to one of the suction tips positioned thereabove and driving the supply rod downwardly; a gel discharging mechanism provided at a side of the mounting table opposite to the seed vessel for providing a gel that coats seeds; a detector sensor for detecting when each of the suction tips is positioned just above one or the other of the seed carrying surface of the supply rod and the gel discharging mechanism; and a control device for driving the supply rod actuator and the rotary drive and switching the electromagnetic valves in synchronism with operation of the gel discharging mechanism.

In the seed supplying mechanism of the above construction, the rotary arm is rotated by 180° by actuating the rotary drive means and is stopped to position the suction tips just above the gel discharging mechanism and the supply rod on receiving a detector signal from the detector sensor.

An air pressure is supplied to the one of the suction tips located above the gel discharging mechanism to cause the seed sucked thereto to fall into the gel discharging mechanism.

Concurrently, the supply rod actuator is actuated to move the supply rod upwardly so that the other of the suction tips, the pressure inside which is made negative, vacuum-attracts one seed from the limited number of seeds placed on the supply rod.

When vacuum-attraction of a seed is completed, the supply rod is moved downwardly, followed by again rotating the rotary arm through 180° by actuating the rotary drive means and positioning the suction tips just above the gel discharging mechanism and the supply rod. One cycle of the seed coating is thus completed.

These operations are continuously repeated and seeds are successively supplied to the gel discharging mechanism.

The above and other objects, features and advantages of this invention will become apparent from the following description and the appended claims, taken in conjunction with the accompanying drawings in which like parts or elements are denoted by like reference characters.

DESCRIPTION OF THE PREFERRED EMBODIMENT

Figure 1:
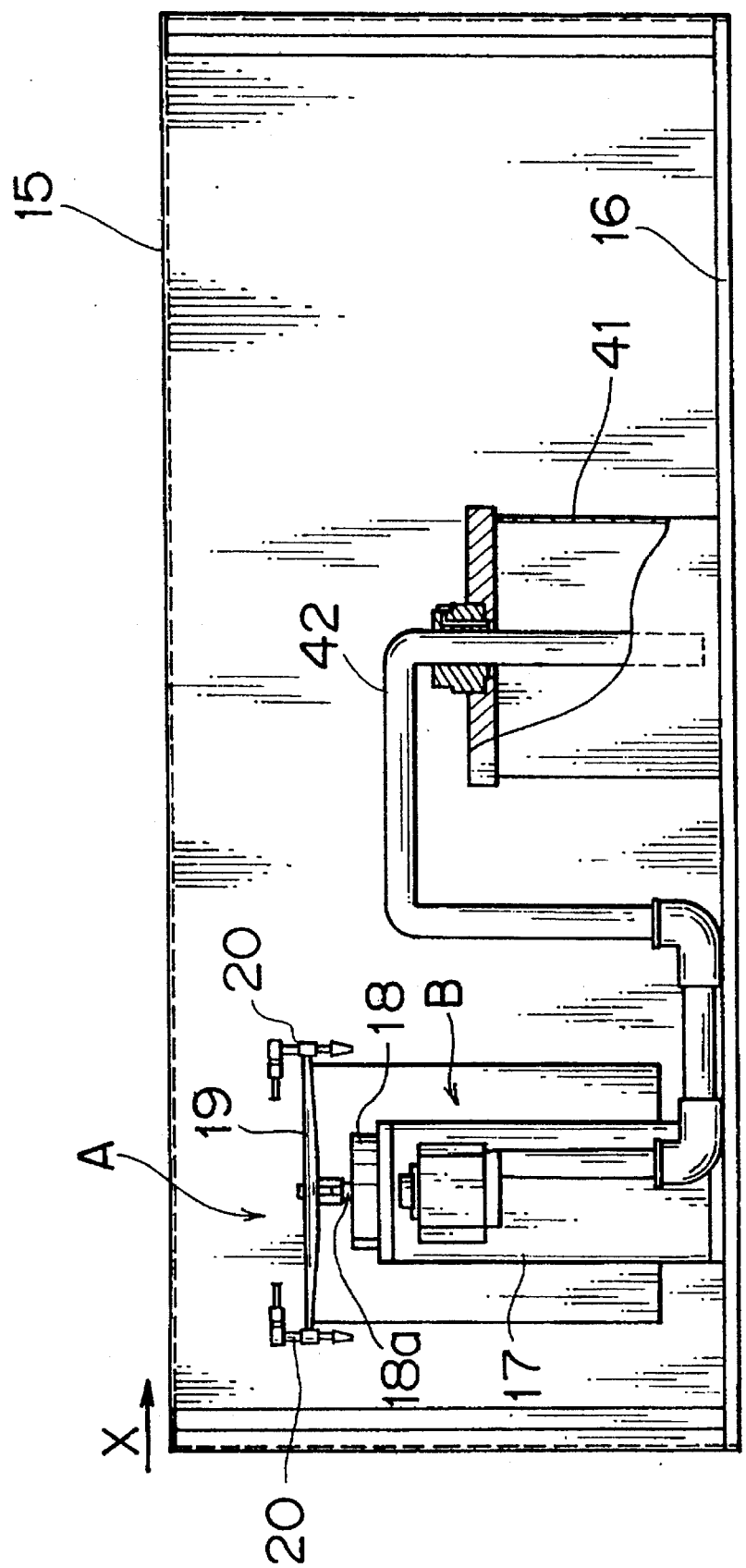
FIG. 1 is a front view of a seed coating apparatus to which this invention is applied.
Figure 2:
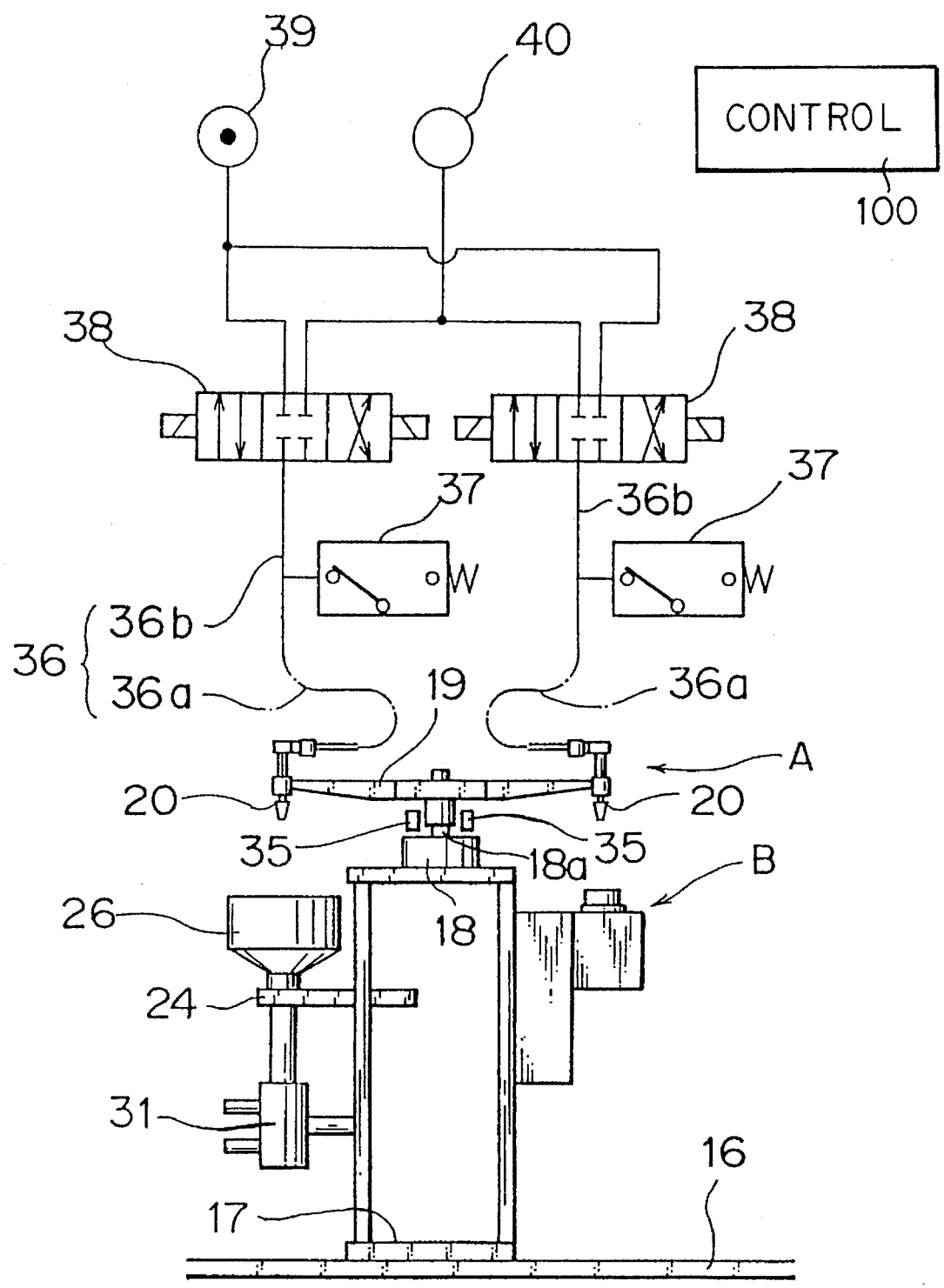
FIG. 2 is a view of a seed supplying mechanism according to a preferred embodiment of this invention seen in the direction of an arrow X in FIG. 1, with a pipeway shown in an air pressure circuit diagram.

Referring to FIG. 1, on a shelf 16 provided inside a casing 15 is disposed a mounting table 17, on top of which is fixed a rotary drive 18 comprising a rotary actuator. As shown in FIG. 2, a rotary arm 19 is at a central portion thereof fixed to a rotary shaft 18a of the rotary drive 18, and suction tips 20 are fixedly provided at opposite ends of the rotary arm 19 for vacuum-attracting seeds.

Figure 5:
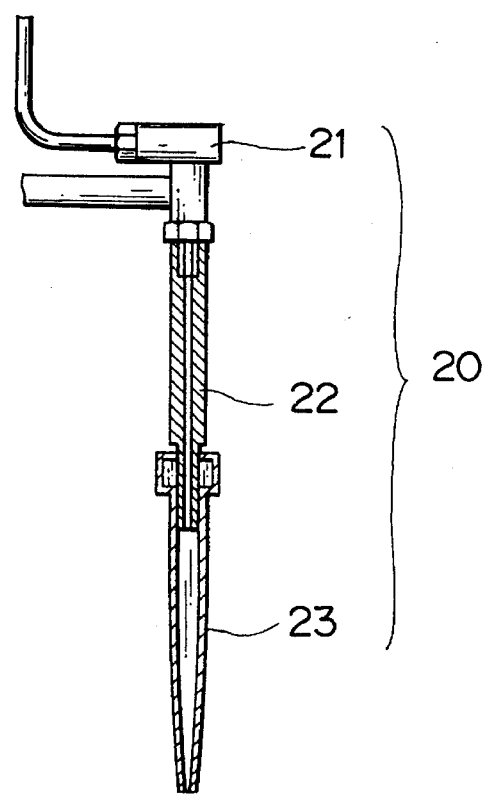
FIG. 5 is a partially cutaway front view of a seed suction tip preferably employed in this invention.

Each suction tip 20, as shown in FIG. 5, is made up of a pipe fitting 21 fixed to the end of the rotary arm, a hollow shaft 22 threaded into the lower end of the pipe fitting 21, and a tip 23 resiliently fitted to the lower end of the hollow shaft 22.

The tip 23 is formed of a plastic material and has a cylindrical configuration that becomes smaller in diameter towards its front end. The tip 23 has an inner diameter of such size as to suck one seed and is replaced by another differently-sized tip in accordance with the size of the seeds to be sucked.

On the right side of the mounting table 17 in FIG. 2 is mounted a gel discharging mechanism B and on the left side of the mounting table 17 is mounted a seed vessel 26 via a bracket 24 extending from the mounting table 17.

Figure 3:
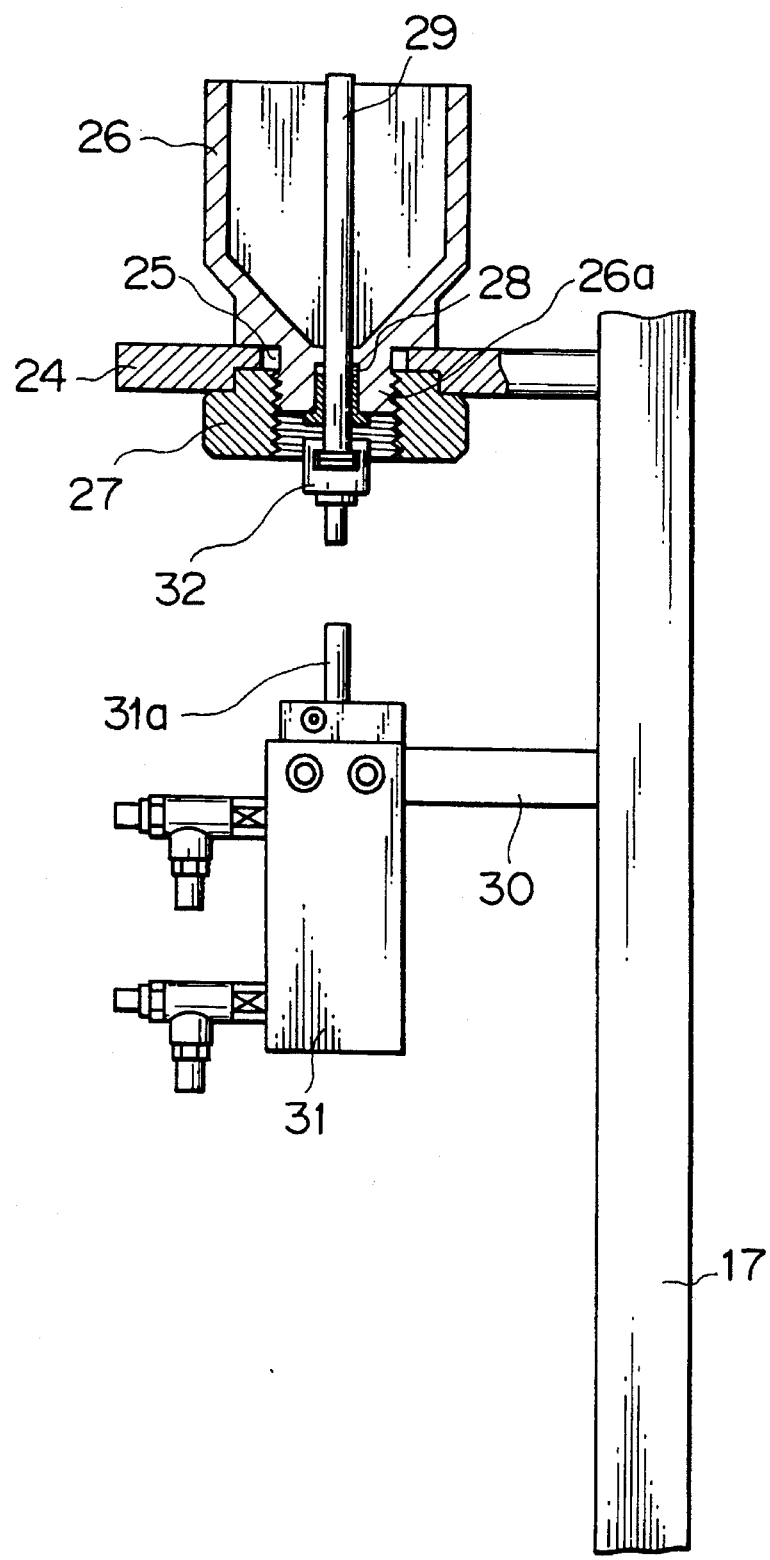
FIG. 3 is a partially cutaway fragmentary enlarged view of the seed supplying mechanism in FIG. 2.

The seed vessel 26, as shown in FIG. 3, has a smaller diameter portion 26a at a lower portion thereof, and the bracket 24 is at one lateral side formed with an elongate notch 25 into which the smaller diameter portion 26a of the seed vessel 26 is loosely fitted. The smaller diameter portion 26a is on an outer periphery thereof formed with a male screw and a lock handle 27 with a corresponding female screw is threaded over the smaller diameter portion 26a to secure the seed vessel 26 to the bracket 24.

The seed vessel 26 for accommodating seeds therein is opened at an upper portion thereof, has an inner circumferential wall in the form of a truncated cone, and has a throughhole 28 extended through the bottom portion of the smaller diameter portion 26a, into which is vertically movably inserted the supply rod 29.

An actuator 31 for moving the supply rod upwardly and downwardly is provided below the bracket 24, at a cylinder table 30 mounted at the left side of the mounting table 17.

Figure 4:
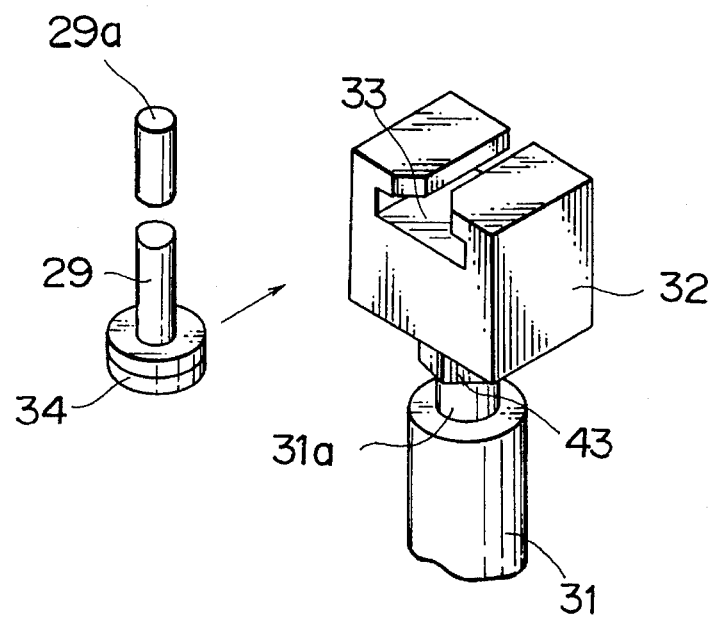
FIG. 4 is a perspective view of a supply rod and a supply rod actuator preferably employed in the seed supplying mechanism of this invention, shown in the process of fitting to each other.

The supply rod actuator 31 includes a piston rod 31a and an air cylinder that drives the piston rod 31a upwardly, the piston rod having a male screw formed at the upper end thereof over which a fitting 32 is threaded. As shown in FIG. 4, the fitting 32 has in its top surface a T-slot 33 arranged in parallel with the plane in which the elongate notch 25 lies, and the supply rod 29 passed through the throughhole 28 has at the lower end a T-portion 34 having a T-shaped configuration in cross section. The T-portion 34 is removably inserted into the T-slot 33. Denoted at reference numeral 43 is a lock nut for fixation of the fitting 32.

On its upper end surface, the supply rod 29 has a seed carrying surface 29a. When the supply rod actuator 31 is actuated to drive the supply rod 29 upwardly, the seed carrying surface 29a and the seeds thereon are brought close to the lower end of the suction tip 20 so that one of the seeds is sucked into the suction tip 20.

Below the rotary arm 19 are disposed detector sensors 35 (FIG. 2) that detect when the suction tips 20 at the opposite ends of the rotary arm 19 are positioned just above the supply rod 29 and the nozzle plunger 8 of the gel discharging mechanism B and send a signal to a control device 100.

As shown in FIG. 2, a pipeway 36 includes a flexible portion 36a and a stationary portion 36b connected to the flexible portion, the flexible portion 36a being at the other end connected to the pipe fitting 21 of a suction tip 20 and the stationary portion 36b being in communication by way of an electromagnetic valve 38 with an air pressure source 39 and a negative pressure source 40. The stationary portion 36b has a branch pipe in communication with a suction pressure switch 37 which sends a signal to the control device 100 when the suction tip 20 has sucked a seed and the pressure inside the pipeway 36 has gone negative to an increased degree.

Figure 6:
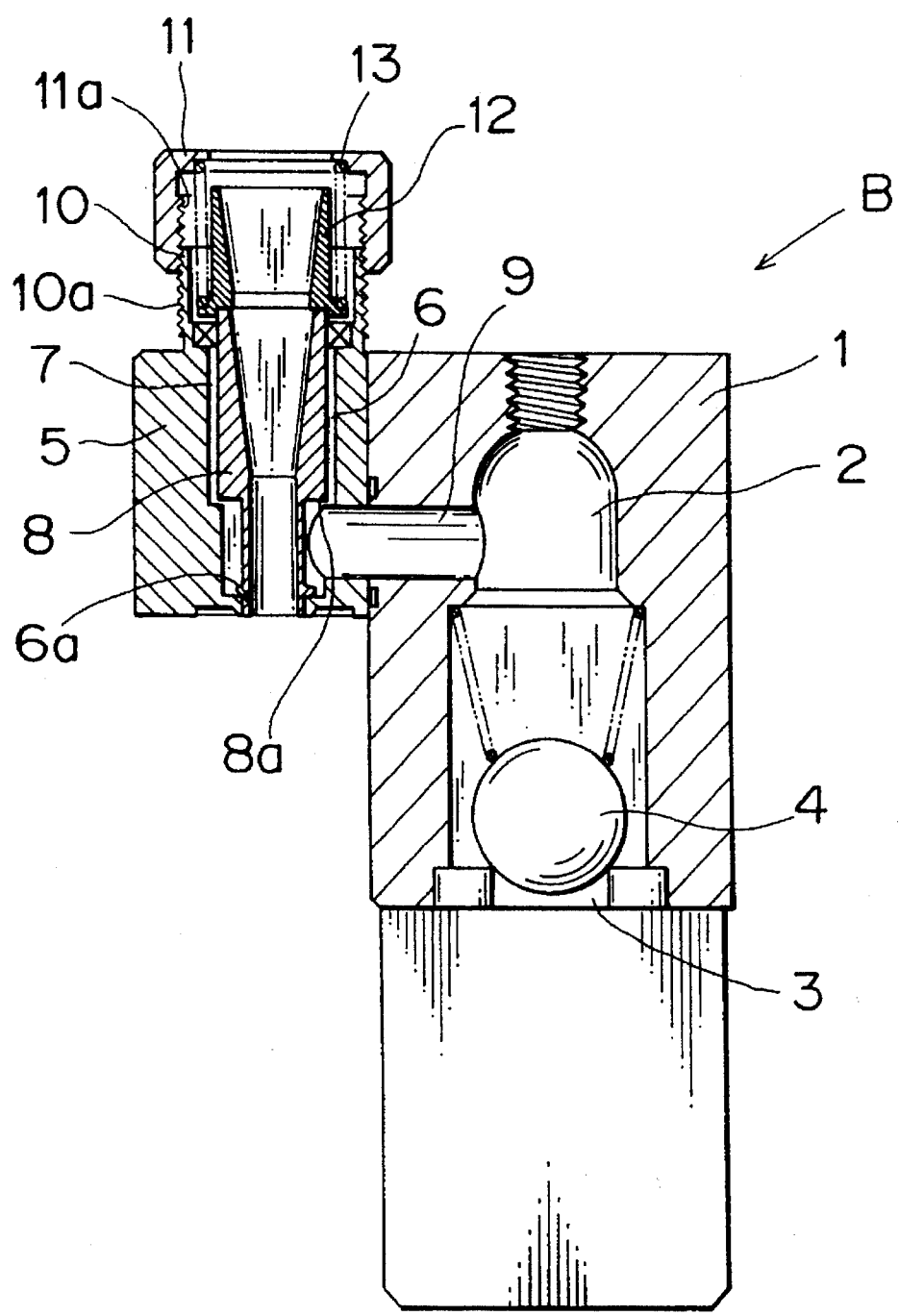
FIG. 6 is a longitudinal sectional view of a gel discharging mechanism with which this invention is applied.

To an opening 3 of the gel discharging mechanism B (FIG. 6) is connected a pipeway 42 which is in communication with a coating material tank 41 provided on the shelf 16 as shown in FIG. 1.

The operation of the thus constructed seed supplying mechanism for seed coating apparatus will now be described.

The rotary drive 18 is actuated to rotate its rotary shaft 18a and thus the rotary arm 19 by 180° and is stopped on receiving a detector signal from the detector sensor 35 to position each of the suction tips 20 just above one or the other of the nozzle plunger 8 of the gel discharging mechanism B and the supply rod 29.

Air pressure is supplied to the suction tip 20 positioned above the gel discharging mechanism B so that the seed sucked thereto is dropped into the nozzle plunger 8 of the gel discharging mechanism B.

Concurrently, the supply rod actuator 31 is actuated to drive the supply rod 29 upwardly so that the other of the suction tips 20, the pressure inside which has gone negative, vacuum-attracts one seed out of the small number of seeds placed on the supply rod 29.

On completion of attraction of a seed by the suction tip 20, the supply rod 29 is lowered, and then the rotary drive 18 is again actuated to rotate the rotary arm 19 by 180° to position the suction tips 20 just above the nozzle plunger 8 of the gel discharging mechanism B and the supply rod 29. One cycle of the seed coating is thus completed.

This cycle is continuously repeated and seeds are successively supplied to the gel discharging mechanism B.

After the gel-coating of seeds is completed, the remaining seeds are removed from inside the seed vessel 26 to subject the inside of the seed vessel 26 to cleaning. In this instance, since the seed vessel 26 is loosely fitted in the elongate notch 25 in the bracket 24 and the T-portion 34 at the lower end of the supply rod 29 is removably inserted into the T-slot 33 arranged in parallel with the elongate notch 25, the seed vessel 26 and the supply rod 29 may be easily detached by, after loosening the lock handle moving the seed vessel 26 horizontally together with the supply rod 29.

The advantages of the seed supplying mechanism for seed coating apparatus according to this invention may be summarized as follows.

1) Since a small number of seeds are placed on the upwardly moved supply rod, it is unlikely that a plurality of seeds sucked to the suction tip interfere with each other to cause suction errors even when the seed vessel is loaded with plenty of seeds.

2) Since the supply rod is moved upwardly and downwardly instead of moving the seed vessel itself, the time required for the suction operation is shortened, leading to the speeded-up supply operation of seeds.

3) The seed vessel is easily detachable, leading to an advantage in changing the seeds to be coated.

4) Since errors in sucking seeds are unlikely to occur even when the seed vessel is loaded with plenty of seeds, there is no need to provide an automatic seed supplying device, thus preventing the structure of the entire seed coating apparatus from becoming complicated and costly to produce.

What is claimed is:

1. A seed supplying and coating apparatus, comprising:

a mounting table;

a rotary drive having a rotary shaft, fixedly mounted on an upper surface of said mounting table;

a rotary arm fixed at a center thereof to said rotary shaft of the rotary drive;

suction tips provided at opposite ends of said rotary arm for sucking and dropping seeds, said suction tips each connected to a pipeway in communication by way of an electromagnetic valve to a positive pressure source and a negative pressure source;

a seed vessel provided at one side of said mounting table for containing seeds therein, said seed vessel being opened at an upper portion thereof and having a throughhole in a bottom portion thereof;

a supply rod provided with a seed carrying surface, passed through said throughhole in the bottom portion of the seed vessel and connected at a lower end thereof with an actuator for driving said supply rod upwardly to bring said seed carrying surface adjacent to one of said suction tips positioned thereabove and driving said supply rod downwardly;

a gel discharging mechanism provided at a side of said mounting table opposite to said seed vessel for providing a gel that coats seeds;

a detector sensor, disposed adjacent the rotary arm, for detecting when each of said suction tips is positioned above said seed carrying surface of the supply rod or said gel discharging mechanism; and a control device, associated with the detector sensor, said supply rod actuator, said rotary drive and said electromagnetic valves, for driving said supply rod actuator and said rotary drive and for switching said electromagnetic valves in synchronism with operation of said gel discharging mechanism.

2. A seed supplying mechanism according to claim 1, wherein said seed carrying surface is formed at an upper end surface of said supply rod.

3. A seed supplying mechanism according to claim 1, wherein said seed vessel has a smaller diameter portion at a lower portion thereof, and wherein said seed vessel is provided at said one side of the mounting table via a bracket having a notch at one side thereof into which said smaller diameter portion of the seed vessel is removably fitted.

4. A seed supplying mechanism according to claim 3, wherein said supply rod is connected with said supply rod actuator via a T-portion formed at a lower end of said supply rod and a T-slot in parallel relation with a horizontal plane where said notch of the bracket lies, formed at an end of said supply rod actuator into which said T-portion is removably fitted.

5. A seed supplying mechanism according to claim 4, wherein said smaller diameter portion of the seed vessel has a male screw formed on an outer periphery thereof over which a lock handle is threaded to secure said seed vessel to said bracket.

* * * * *